May 28, 1940.  W. E. SMITH  2,202,405

METHOD OF RESISTANCE WELDING

Filed July 31, 1936   2 Sheets—Sheet 1

INVENTOR.
WILLIAM E. SMITH
BY
ATTORNEY.

INVENTOR.
WILLIAM E. SMITH
BY
ATTORNEY.

Patented May 28, 1940

2,202,405

UNITED STATES PATENT OFFICE 2,202,405

METHOD OF RESISTANCE WELDING

William E. Smith, Detroit, Mich., assignor to The Midland Steel Products Company, Cleveland, Ohio, a corporation of Ohio Application July 31, 1936, Serial No. 93,671

2 Claims. (Cl. 219—10)

This invention relates to connecting members and a method of attaching them to metal plates whereby parts may be mounted with respect to the metal plates by attachment to the connecting members.

An object of the invention is to provide a connecting member adapted to be welded to the defining edge of a recess in a metal plate wherein the defining edge of the recess is employed as a welding surface.

Another object of the invention is to provide a connecting member adapted to be supported by the defining edge of a recess in a metal plate and fused thereto.

A further object of the invention is to provide a connecting member adapted to be welded to the defining edge of a recess in a metal plate and having means engageable with the said defining edge to locate the connecting member in the recess prior to and during the welding operation.

Another object of the invention is to provide a connecting member having a conical section adapted to be fused with the defining edge of a recess in a metal plate whereby due to the conical section of the connecting member the latter may be disposed in recesses of different sizes within the limit of the conical section.

Other objects and advantages of the invention will become apparent during the course of the following description.

Figure 1:
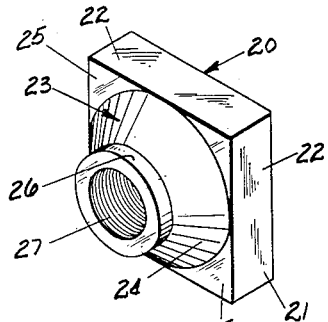
Figure 2:
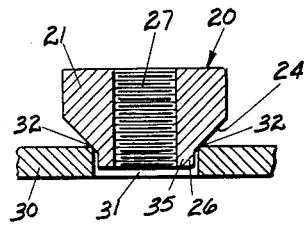
Figure 3:
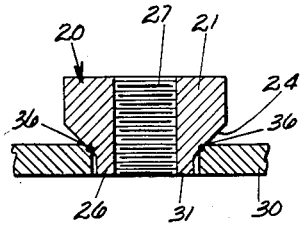
Figure 4:
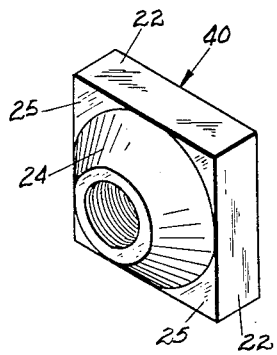
Figure 5:
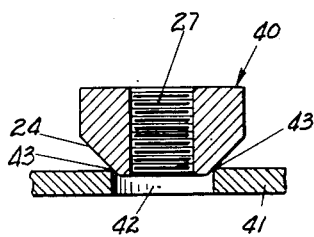
Figure 6:
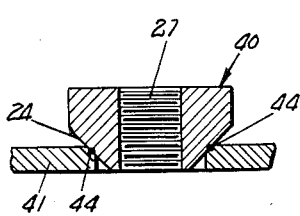
Figures 7, 8:
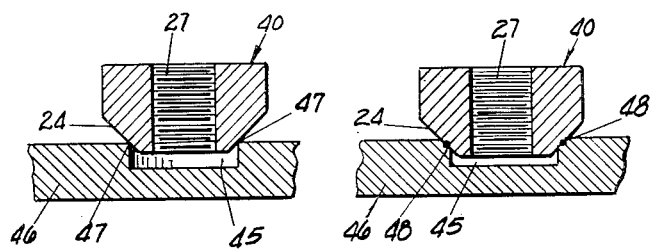
Figure 9:
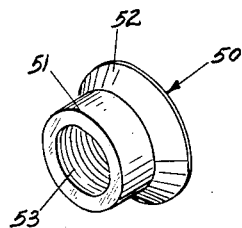
Figures 10, 11:
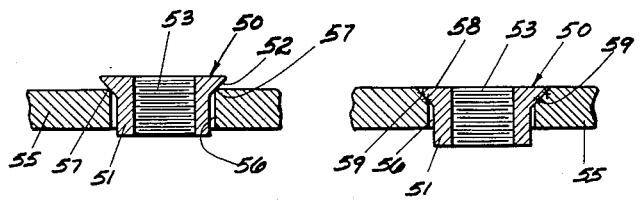
Figure 12:
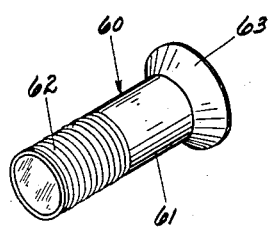
Figure 13:
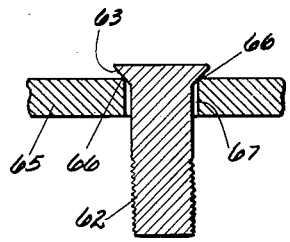
Figure 14:
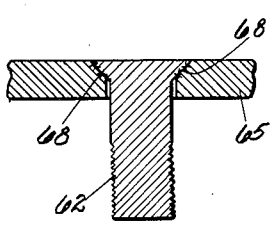
Figure 15:
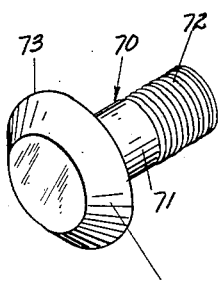
Figure 16:
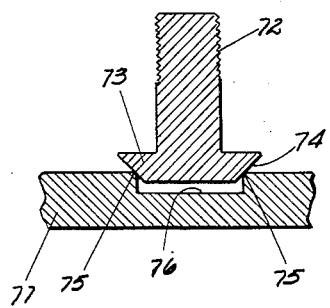
Figure 17:
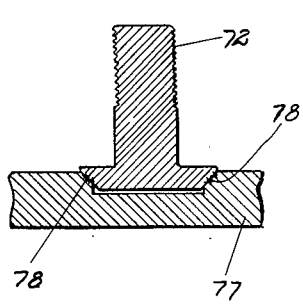

In the accompanying drawings forming a part of this description and wherein like numerals are employed to designate like parts throughout the several views:

Fig. 1 is a perspective view of one form of connecting member,

Figs. 2 and 3 are sectional views respectively showing this connecting member supported in a perforation of a metal plate for welding thereto and after fusion with the metal plate, Fig. 4 is a perspective view of another form of connecting member, Figs. 5 and 6 are sectional views respectively showing this connecting member supported in a perforation of a metal plate for welding thereto, and after fusion with the metal plate, Figs. 7 and 8 are sectional views respectively showing the connecting member of Fig. 4 disposed in a pocket of a metal plate prior to and after fusion thereto, Fig. 9 is a perspective view of a further modified form of connecting member, Figs. 10 and 11 are sectional views showing respectively this connecting member in a perforated metal plate prior to and after fusion thereto, Fig. 12 is a perspective view of another form of connecting member, Figs. 13 and 14 are sectional views showing respectively this connecting member supported in an aperture of a metal plate for welding thereto and after fusion with the metal plate, Fig. 15 is a perspective view of another form of connecting member, and Figs. 16 and 17 are sectional views showing respectively this connecting member in a pocket of a metal plate prior to and after fusion thereto.

The form of connecting member shown in Figs. 1 through 3 comprises a nut 20 preferably of cold rolled steel stock having a body portion 21 of any desired form, here shown as polygonal shape providing side walls 22, and a shank portion 23 having a conical section 24 tapered inwardly from the base 25 of the body portion 21 to terminate in a centrally disposed cylindrical end 26. A threaded bore 27 extends axially through the nut 20.

This nut may be welded to a metal plate 30 by disposing the connecting member 20 in a hole 31 extending through the plate and fusing the conical section 24 with the annular defining edge 32 of the aperture 31.

The shank portion of the nut 20 provides means for locating the nut in the recess 31, that is, the cylindrical end 26 functions as a primary pilot or locating means to initially locate and hold the nut with respect to the recess 31, and the conical section 24 acts as a secondary locating means which engages the defining edge 32 of the recess 31 which supports the nut in the recess 31.

Upon application of welding current and pressure the defining edge 32 of the recess and that annular portion of the conical section 24 engaging the annular defining edge 32 of the recess are fused together to provide a fluid tight seal in the form of an annular welded ring 36.

In Fig. 3 the cylindrical end 26 is shown as terminating flush with the surface of the plate 30, but if it is desired the end 26 may be of such length as to terminate inwardly of or beyond the surface of the plate.

Figs. 4 through 6 illustrate a connecting member 40 which is similar in all respects to the preceding modification, except that the primary locating means or cylindrical end 26 is eliminated.

In order to weld the connecting member 40 to a perforated metal plate 41, the conical section 24 is inserted in the opening 42 and the defining edge 43 of the latter engages the same to support the connecting member 40 in proper position. Upon application of welding current the defining edge 43 of the opening 42 is fused with a portion of the conical section 24 to produce a fluid tight ring weld 44 that is relatively small in area with respect to the area of the conical section 24.

Figs. 7 and 8 illustrate the method of welding the connecting member 40 in an opening 45 which extends only partially through a metal plate 46. Here also the defining edge 47 of the opening 45 acts as a welding surface to be fused with a small portion of the conical section 24 to provide a welded joint 48. If desired, the form of connecting member shown in Figs. 1 through 5 may be disposed in the opening 45 and welded to the edge 47 thereof.

Another embodiment of the invention is shown in Figs. 9 through 11 and comprises a connecting member 50 having a cylindrical body portion 51 terminating at one end in an outwardly flared conical head 52, and is provided with an axially threaded bore 53.

In order to weld the connecting member 50 to a perforated metal plate 55 the cylindrical body portion 51 is inserted in the opening 56 with the conical head 52 resting on the defining edge 57 of the recess 56 to support the connecting member therein. In carrying out the welding operation the connecting member 50 is forced inwardly of the recess 56 to such an extent so as to bring the end 58 of the connecting member substantially flush with the surface of the plate 55 whereby the welded area 59 covers a substantial portion of the conical head 52. It will be understood if the opening 56 were larger than shown in Fig. 10 that the defining edge 57 of the recess would initially support the connecting member at a point closer to its end 58 and accordingly the area of fusion 59 would not extend over so great an area along the conical head 52.

In the preceding modifications all the connecting members are provided with an axial threaded bore, but it is to be understood that the bores need not be threaded, or may be eliminated depending upon the adjuncts to be employed with the connecting member, and that the latter may be of any desired shape.

In the modification shown in Figs. 12 through 14 the connecting member is in the form of a bolt or screw having a cylindrical shank portion 61 threaded at one end 62 and terminating at the opposite end in an enlarged outwardly flared conical head 63.

This connecting member may also be welded to a perforated metal plate 65 wherein the annular defining edge 66 of the aperture 67 provides a welding surface which is fused with the conical head 63 to form the annular welded joint 68.

Another embodiment of the invention is shown in Figs. 15 through 17 and comprises a connecting member 70 in the form of a bolt having a cylindrical shank 71 threaded at one end portion 72 and terminating at the opposite end in a head 73 provided with an inwardly flared conical periphery 74. In this instance the bolt 70 is shown welded to the defining edge 75 of a recess 76 which extends only partially through the metal plate 7. The bolt is welded to the metal plate in the manner hereinbefore described to provide an annular welded joint 78.

From the foregoing it will be understood that the connecting members may be inserted in recesses of various sizes due to the conical section of the connecting members, and that the amount of the conical sections disposed in the recesses depends upon the size of the recesses. The length of the welding period and welding pressure also influences the amount of the conical sections buried in the recesses of the metal plate. If the welding period is of short duration the connecting member is not forced as far into the recess as for a longer welding period. The area of the welded joint will also be smaller for a short welding period as shown for example at 36 in Fig. 3 than for a longer welding period as shown for example at 68 in Fig. 14.

It will be understood that various changes in the construction of the connecting members may be resorted to without departing from the scope of the appended claims.

I claim:

1. A method of resistance welding tubular and plate members together which comprises, providing a tapered edge at the end of the tubular member, forming an opening in said plate member intermediate to the inside and outside dimensions of the tubular member and having walls that are generally parallel, bringing the tapered end surface of said tubular member into continuous aligned contact with the edge of the opening in said plate member, raising the engaging portions of said members to welding temperature by the passage of an electric current therebetween, and applying pressure to fuse said members together.

2. A method of resistance welding a tubular member into an opening in a second member which comprises, providing a tapered edge at the end of a tubular member, providing a second member having an opening intermediate to the inside and outside dimensions of the tubular member and having walls that are generally parallel, bringing the tapered end surface of said tubular member into continuous aligned contact with the edge of the opening in said second member, raising the engaging portions of said members to welding temperature by the passage of an electric current therebetween, and applying pressure to weld said members together

WILLIAM E. SMITH.